United States Patent [19]
Pisetski

[11] Patent Number: 6,028,820
[45] Date of Patent: Feb. 22, 2000

[54] METHOD FOR DETERMINING THE PRESENCE OF FLUIDS IN A SUBTERRANEAN FORMATION

[75] Inventor: Vladimir B. Pisetski, Yekaterinburg, Russian Federation

[73] Assignee: Trans Seismic International, Inc., San Francisco, Calif.

[21] Appl. No.: 09/134,616

[22] Filed: Aug. 14, 1998

Related U.S. Application Data

[63] Continuation-in-part of application No. 08/909,454, Aug. 11, 1997, Pat. No. 5,796,678.
[51] Int. Cl.$^7$ .................................................. G01V 1/00
[52] U.S. Cl. ............................... 367/38; 367/37; 367/47; 367/59; 367/49
[58] Field of Search .................................. 367/47, 49, 38, 367/73, 37, 59

[56] References Cited

U.S. PATENT DOCUMENTS

| | | |
|---|---|---|
| 4,535,417 | 8/1985 | Peacock . |
| 4,633,399 | 12/1986 | Stebens et al. . |
| 4,633,447 | 12/1986 | Bodine . |
| 4,780,859 | 10/1988 | Hadidi et al. . |
| 5,134,590 | 7/1992 | Garotta . |
| 5,136,552 | 8/1992 | Kelly et al. . |
| 5,136,554 | 8/1992 | Thomsen et al. . |
| 5,268,994 | 12/1993 | Keskes . |
| 5,311,484 | 5/1994 | Anderson et al. . |
| 5,408,441 | 4/1995 | Barr et al. . |
| 5,463,594 | 10/1995 | Lindsey et al. . |
| 5,475,589 | 12/1995 | Armitage . |
| 5,508,973 | 4/1996 | Mallick et al. . |
| 5,555,218 | 9/1996 | Chambers et al. . |
| 5,586,082 | 12/1996 | Anderson et al. . |

OTHER PUBLICATIONS

"Velocities of Seismic Waves in Porous Rock", M. Nafi Toksoz, et al; Geophysics, vol. 41, No. 4 (Aug. 1976), pp. 621–641.

Primary Examiner—Christine Oda
Assistant Examiner—Anthony Jolly
Attorney, Agent, or Firm—Reidlaw, L.L.C.; John S. Reid

[57] ABSTRACT

A method for seismic data interpretation for the purposes of identification of oil, gas and water accumulation locations and delineation of their contours uses a model of discrete media with inhomogeneous stresses. For a selected reflection horizon, the relative value of overall pressure gradient is calculated on the basis of instantaneous amplitudes and frequencies of seismic signals using a derived relationship between the reflection coefficients of elastic waves and the stress condition parameter. The calculation technique uses estimates of instantaneous amplitudes and frequencies smoothed over the entire seismic horizon or its fragment. A generalized model of normal (lithostatic) pressure is excluded, and the final interpreted parameters have the sense of relative estimates of anomalous pressure caused by basin dynamics. Maps of anomalous relative pressure and isochronal maps corrected for signal frequency variations along the reflection horizon are constructed using tracking of one or more seismic horizons. The regions of low anomalous pressure within the analyzed fragment of a time section coincident with favorable geometry and specific patterns of the reflection time map are the most probable locations of the accumulations of fluids.

13 Claims, 6 Drawing Sheets

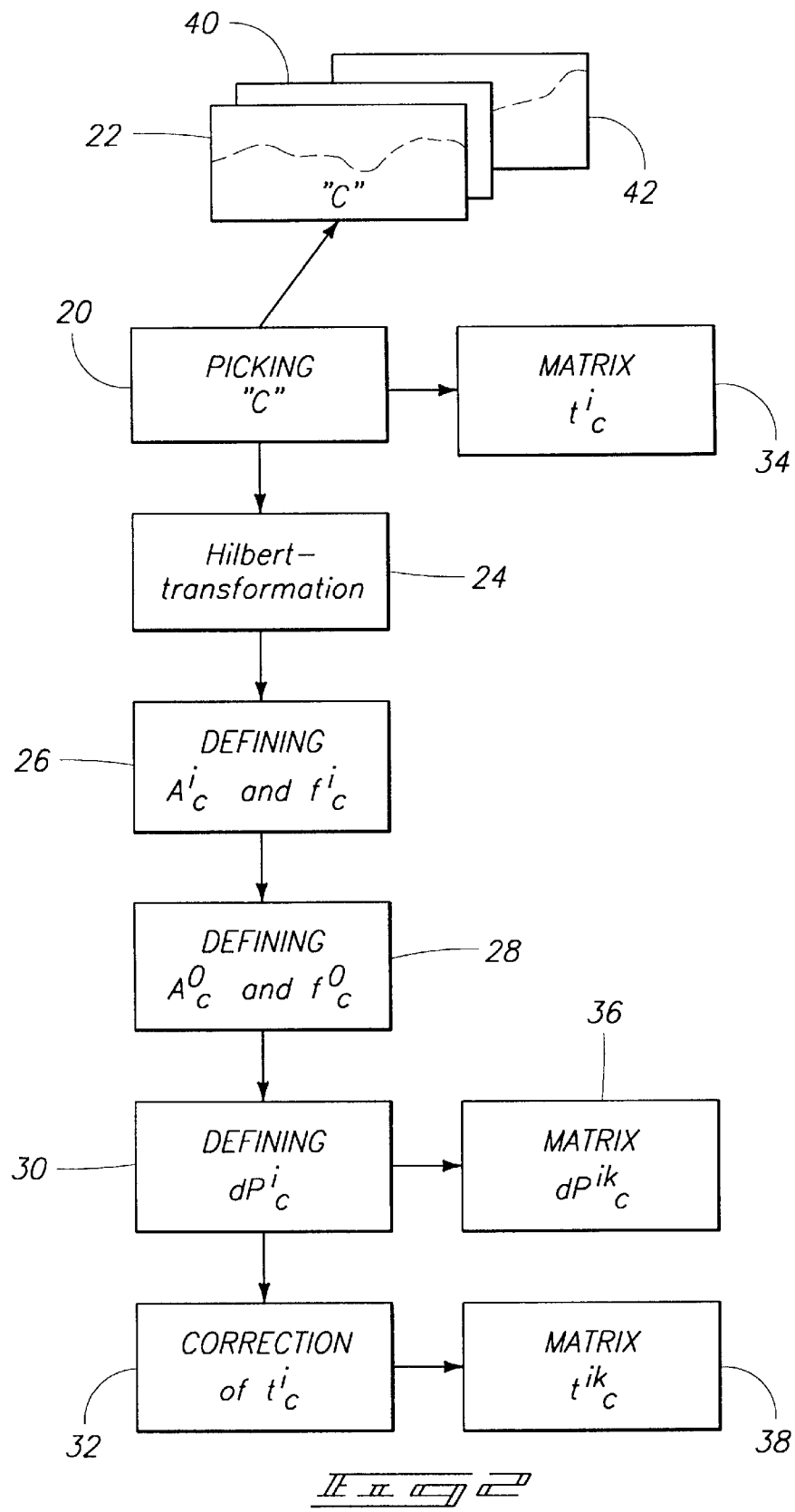

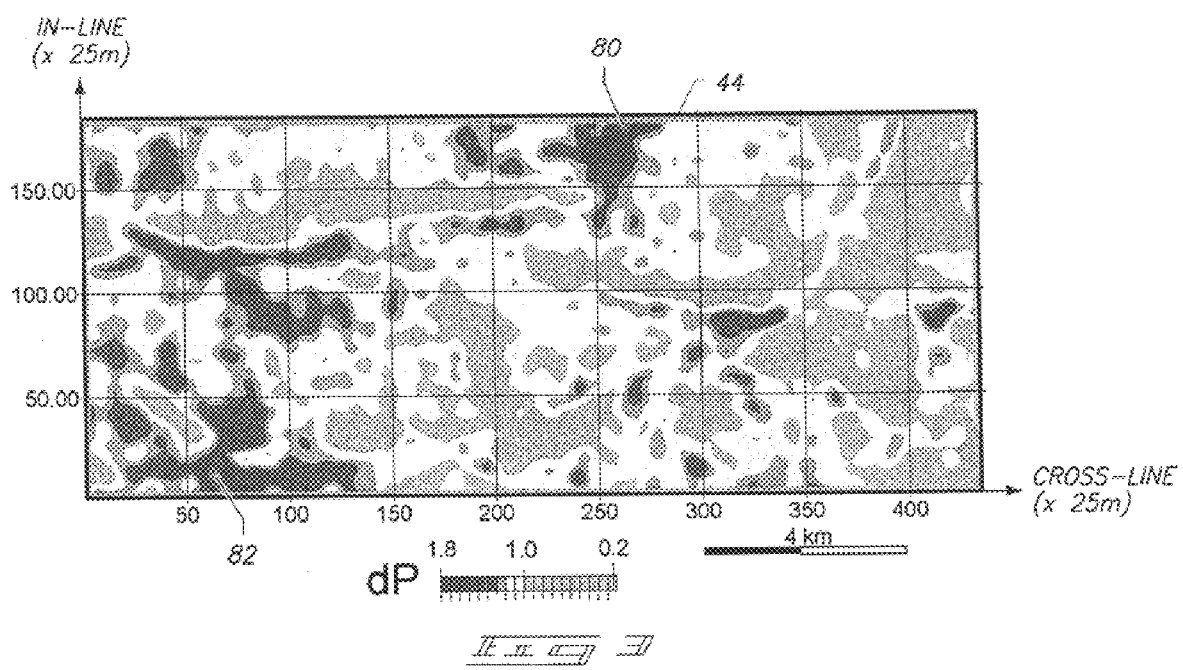

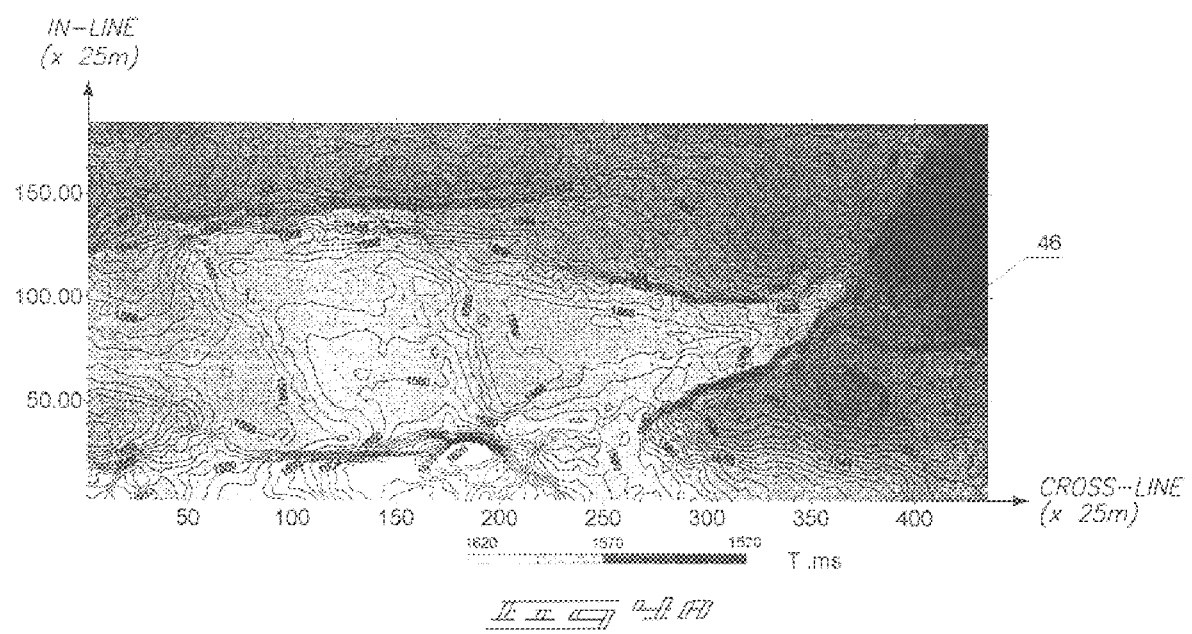

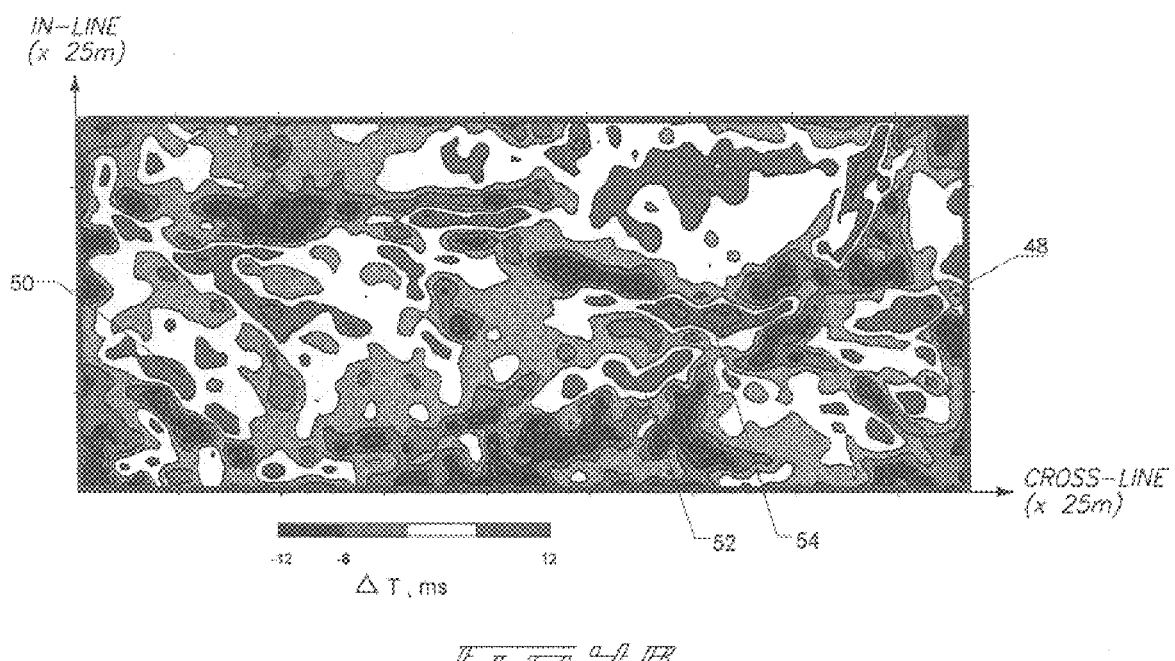

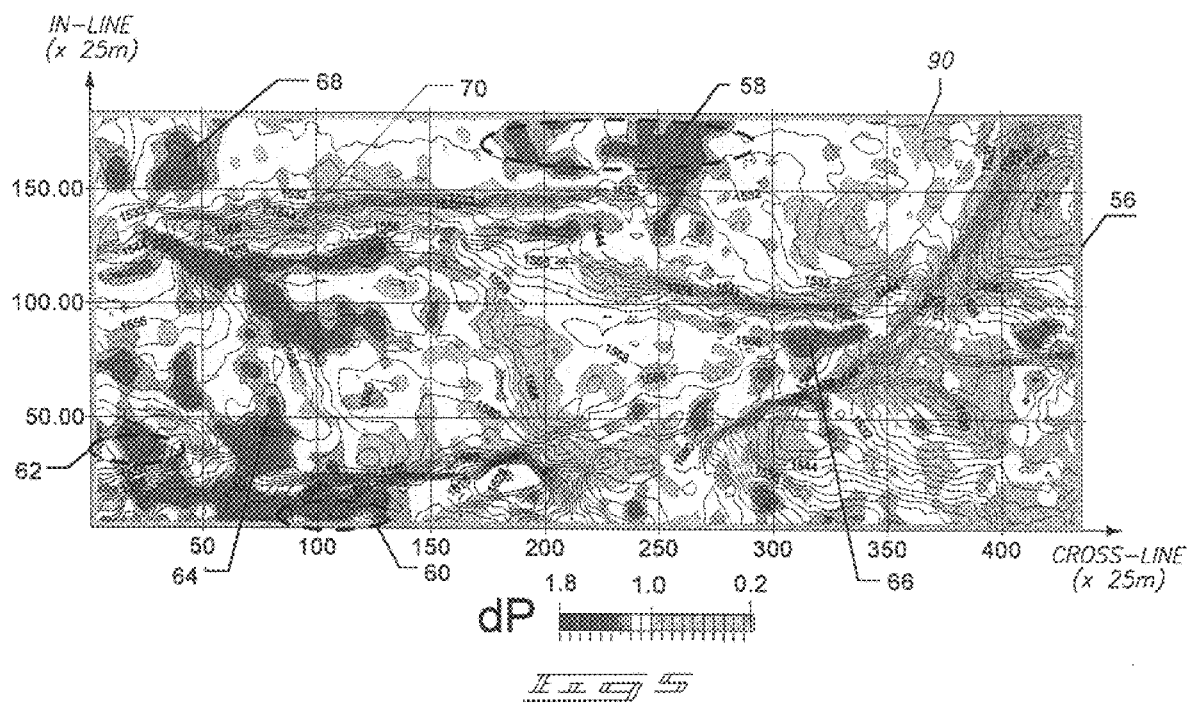

METHOD FOR DETERMINING THE PRESENCE OF FLUIDS IN A SUBTERRANEAN FORMATION

CROSS REFERENCE TO RELATED APPLICATION

This application is a Continuation in Part of U.S. patent application Ser. No. 08/909,454, filed Aug. 11, 1997 now U.S. Pat. No. 5,796,678.

FIELD OF INVENTION

This invention pertains to a method of locating fluids in a subterranean formation, and specifically, to a method for determining estimates of anomalous pressure within a time section indicative of the presence of fluid.

BACKGROUND OF THE INVENTION

In the search for subterranean fluids (typically natural gas and/or petroleum), classical methods have used seismic imaging to generate an image of a subterranean region of exploration. Modern three dimensional (3D) seismic imaging has aided a great deal in developing credible models of the region of interest. Information regarding travel time of seismic signals can be used to estimate velocities of various subsurface layers, which provides information indicative of the rock type. Hydrocarbons are often trapped by geologic faults, and so the seismic images are subsequently interpreted to identify rock types which, in conjunction with geologic faults or other phenomenon, would result in an accumulation of fluids in an area in the region of study. However seismic information provides only limited information. Unless the geologic fault has a seal, fluids will not be trapped. Unfortunately, seismic survey data does not contain sufficient information to indicate the presence or absence of a seal. Other information is desirable which, if used in conjunction with seismic images, would improve the probability of finding hydrocarbons.

It is known that the field of so-called prestresses in the earth's crust is determined by two systems of external forces, namely, gravitational and tectonic forces. The joint action of these forces can result in compaction as well as in unloading of rock masses with respect to their normal gravitational or lithostatic stress condition. The existing theory describing stress fields in the earth's crust is absolutely correct for elastic and continuous media. At the same time information derived from a number of wells, drilled down to 10 km, points to the presence of fractures in sedimentary and crystalline parts of the earth's crust. Since there is little reason to expect presence of spatially localized fractures, we can affirm that any real rock unit is bounded by a closed system of fractures and represents a discrete system. Taking into account a well-known concept that any basin represents a tectonically young and consequently active structure, these are all reasons to consider any unit of the sedimentary cover as a part of discrete dynamic system. To date, no one has thought to use information pertaining to stress in the earth's crust as part of a method for determining the presence of fluid in a subterranean formation. My invention uses seismic imaging information in conjunction with formation stress information to improve the reliability of seismic exploration for hydrocarbons.

The publication of J. D. Byerlee ("Friction of Rocks", *Pure Applied Geophysics*, 116 (1978), pp. 615–626) is useful for estimating parameters of stress condition of fractured and discrete rock units. He has found that the maximum differential stress (the difference of main stresses) in the upper part of the earth's crust is limited by the shear strength of fractured rocks. Laboratory investigations show that the sliding friction on the surface of fractured rocks exists until the external load reaches the critical value of brittle failure. At the same time the strength of such a discrete rock unit is determined by cohesion of fractures on its surface and does not practically depend on the elastic moduli of the rock, temperature, strain value, and the type of sliding surface. It is determined that the cohesive force $\tau$ is a linear function of normal load $\sigma_n$ (Byerlee's law):

$$\tau = 0.85\sigma_n, 3 < \sigma_n < 200 \text{MITa} \tag{1}$$

or in the terms of main stresses, the limit value of horizontal stresses down to the depths of 5 km is estimated to be $$\sigma_1 \approx 5\sigma_3, \sigma_3 < 110 \text{MITa} \tag{2}$$

In other words the main component of stress condition variation in discrete media is associated with the change of vertical load. Insignificant movement in the base of a sedimentary basin (for example, in the crystalline basement) results in considerable change of the horizontal component of stress. The strength limit of a rock unit is rapidly reached, and all the sedimentary cover is set in motion continuously approaching the isostatic equilibrium. Thus, it is reasonable to suggest that real sedimentary formations have a high degree of mobility in vertical direction. As time of stress relaxation characteristic for discrete media is significant, the stress distribution in the basin has distinctive contrasting character and is governed by the principles of block dynamics.

The most fundamental theoretical results in the field of elastic wave propagation in prestressed media were derived by M. A. Biot (textbook, *Mechanics of Incremental Deformations*, New York, 1965). Biot introduced a new type of strain, strain of solid rotation. Its introduction is related to non-hydrostatic character of prestress field in the medium (i.e. horizontal and vertical components of the stress field are not equal to each other). In this case each unit volume of the medium has been rotated through some angle with respect to its initial position in the unstressed medium. As a result additional strains appear in the wave field, and their amplitudes are directly proportional to the difference between horizontal and vertical components of the prestress field ($\sigma_1 \square \sigma_3$). A number of researchers studied the equations derived by M. A. Biot and came to the conclusion that the influence of initial stresses on traveltime and, especially, amplitude parameters of seismic waves, can be very significant, and the degree of this influence is proportional to the ratio $P/\mu$ (where P is pressure and $\mu$ is the shear modulus).

A significant number of publications are related to investigation of the stress condition of the earth with the aid of seismic methods. But practically all these investigations were based on the analysis of traveltime parameters and were reduced to attempts to explain complex distribution of velocity parameters by the influence of lithostatic pressure. In this case the stress condition of the subsurface is taken into account indirectly using theoretically and experimentally derived relationships between velocity and external load. In low-pressure regions the amplitudes and frequencies of the reflected signals completely depend on the density of fractures and the load applied to them. And the earth material (its elastic moduli) significantly influences the amplitude parameters of the signals only at the loads close to the strength limit of discrete media.

What is needed then is a method for improving the ability to discover hydrocarbons in a subterranean formation and which makes use of available data, an in particular seismic data which is likely to be collected as part of a exploratory effort in any event.

SUMMARY OF THE INVENTION

The presented invention has been developed as a method for seismic data interpretation targeted at discovery of the areas of the accumulations of the fluids. I have discovered a relationship between reflection coefficient and general rock pressure, which is the basis of my invention. It is assumed that the real sedimentary sequence is a discrete medium subjected to inhomogeneous stresses created by two types of the forces, namely gravitational and tectonic forces. As a result of a sum influence of these two forces, the basin, as a discrete system, is found in continuous movement or in the condition of inhomogeneous stresses. In correspondence with this point of view any stratigraphic sequence is found in different stress conditions in lateral direction, and consequently the amplitude and frequency parameters of reflected signals depend on the value of rock pressure acting on given element of a seismic reflector.

The first step of the developed interpretation method consists in tracking one or several target reflections along stacked time sections. A standard tracking procedure and standard 2D or 3D processing flows are used. The pressure gradients are found using picked travel times for tracked seismic horizons and by calculating parameters of Hillbert transformation (instantaneous amplitudes and phases) for each identified signal. The interpretation formula is directed to estimation of relative pressure changes under the assumption that the smoothed values of instantaneous amplitudes and derivatives of instantaneous phases (instantaneous frequency) correspond to general normal or gravitational pressure within all the study area, while all deviations from the average value represent relative estimates of anomalous pressures and correspond to local regions of decompression and compression.

The obtained map of relative pressure gradients is laid over the isochron map of a tracked horizon improved using the instantaneous phase picking. The principle of determining traveltimes more accurately consists in correction for signal frequency variation along the reflecting horizon in correspondence with the derived dependence of the frequency from pressure. The resulting map of relative pressure variation in combination with reflection time map represents the basis for identifying most probable locations of fluid accumulations. Localized region of anomalous unloading coincident with a closed or semi-closed time high is a physically valid area of hydrocarbon and water accumulation.

The information from the resulting map of relative pressure variation in combination with reflection time map can be further combined with classical seismic interpretation techniques to further enhance the prediction of the presence of fluids in a subterranean formation.

While the invention described herein is particularly useful for predicting the presence of fluid accumulations in a subterranean reservoir, the relationship between reflection coefficient and general rock pressure can also be used to predict rock pressure or pressure gradients within a subterranean formation. Such information can be useful in and of itself, for example, in the study and prediction of earthquakes.

In addition to the methods disclosed and described herein, my invention further includes computer apparatus for implementing the methods.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 2 shows a flow chart of the method for calculating anomalous pressure estimates and corrections for reflection traveltime distortions using a set of stacked seismic sections processed with the aid of 3D techniques.

FIG. 3 is an example of anomalous pressure map for producing sandy-argillaceous Jurassic formation.

FIG. 4a shows an isochron map constructed using a standard technique of reflection horizon tracking.

FIG. 4b shows a map of traveltime corrections for variation in signal frequencies along the reflection horizon.

FIG. 5 shows the final anomalous pressure map laid over isochron map and exploratory well locations.

DETAILED DESCRIPTION OF THE INVENTION

Figure 1:
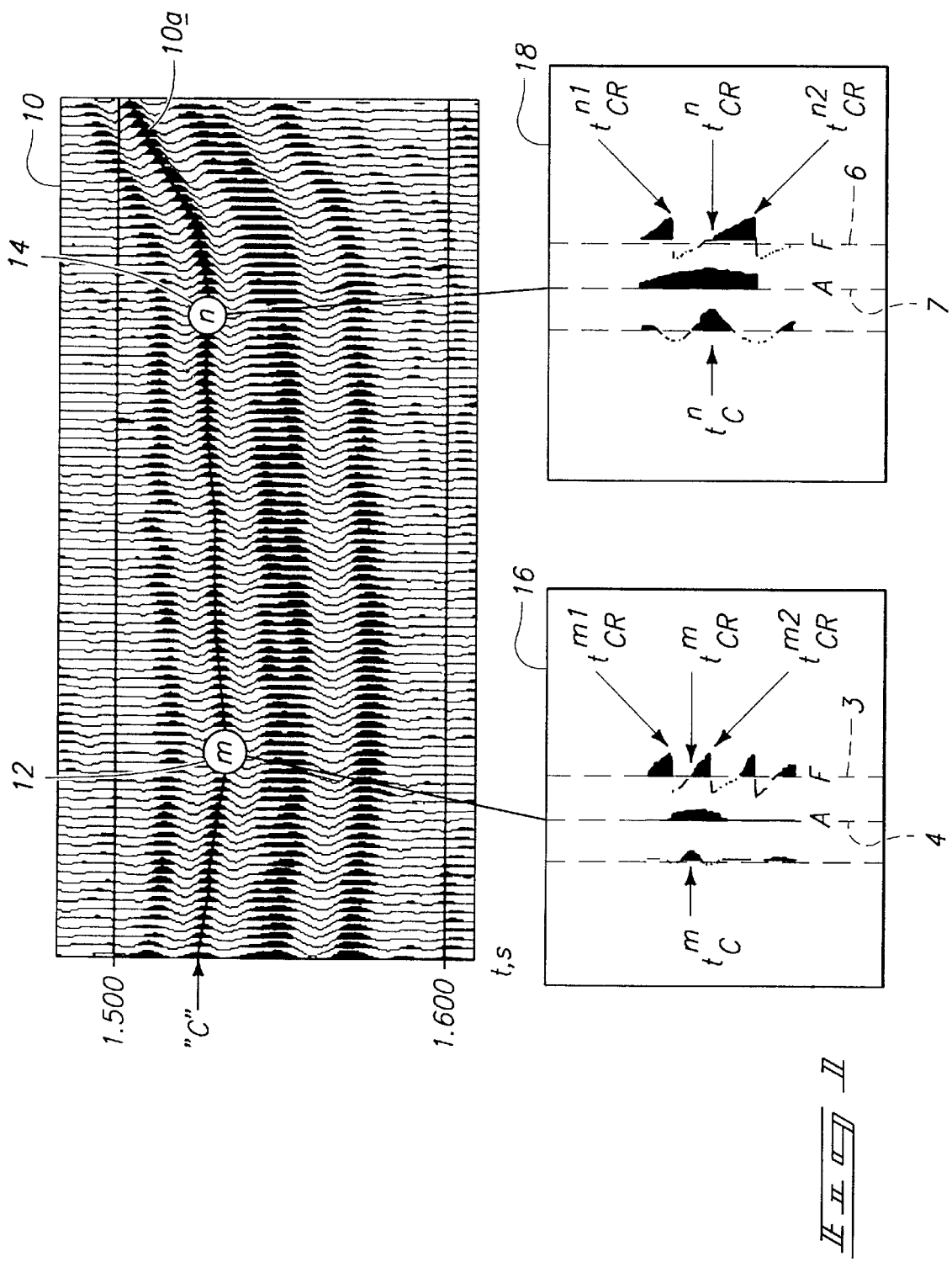
FIG. 1 illustrates the principle of relative pressure calculations for a given seismic horizon on a stacked time section.

Taking into account the information known which is discussed in the Background section above, I concluded that each layer or stratigraphic unit of a sedimentary basin is subjected to variable load along its extent. In one location the layer will have a high load (for example, equal to the normal lithostatic or gravitational pressure), while in the other location the load can be significantly lower, thus leading to the presence of a decompressed zone where reduction of general rock pressure is associated with fracture opening. My invention makes use of this observation since one may predict what will happen to the fluid occupying the pore space of a continuous rock as well as interconnected system of fractures. That is, the fluid, particularly its light fractions, will migrate from the regions of relatively high pressure toward the decompressed zone, and if the closure conditions exist, accumulation and preservation of the accumulation of any type of fluid will take place. It should be noted that the presence of simple anticlinal structures is not necessary, and an accumulation can be formed in absolutely non-traditional conditions. The main factors in this case are the degree of discreteness of a given layer (the spatial density of fractures) and relative change in the general pressure.

Hence, I determined that if one knows the relative distribution of the general stress within all the sedimentary sequence or within its producing interval, it is possible to establish an objective criterion for discovering subsurface fluids accumulations independently from all known structural and lithological conditions favorable for such accumulation. Seismic data is the primary source of information for making the stress condition estimate. At the same time all existing methods and techniques for seismic data interpretation are based on classical solutions to a wave equation for continuous and static media. In these solutions it is common to substitute stresses in initial wave equation by strains using the Hooke's law, i.e. using the elastic moduli. Therefore, the acoustic impedances or parameters derived from them are in practice the informative parameters for seismic data interpretation. But if the discrete dynamic model is used, the wave equation solution should be obtained for prestressed media, and the components of stress condition of real media are the target parameters. These parameters are of principal importance for exploring and discovering new oil and gas pools and water reserves as well as for planning their development.

Immediately following is a description containing the solution to a classical wave equation for a simple case of wave incidence on the interface between two half-spaces one of which is in prestress condition. I will now show my derivation of an expression for normal-incidence reflection coefficient for an elastic wave:

$$A_R = \frac{Z - Z^* + \Delta Z^*/\omega}{Z + Z^* + \Delta Z^*/\omega} \quad (3)$$

where $A_R$ is reflection coefficient, Z and $Z^*$ are acoustic impedances for unstressed half-space and prestressed half-space correspondingly, and $\omega$ is circular frequency, $$\Delta Z^* = PZ^*\omega/\mu^* \quad (4)$$

where P is a value proportional to non-hydrostatic pressure in the stressed half-space, and $\mu^*$ is shear modulus in the stressed medium.

Reflection and Refraction Coefficients for Plane Elastic Waves Propagating in a Prestressed Medium 1. Motion Equations The main law of dynamics $\vec{F} = m\vec{a}$ has the following form for a continuous elastic medium:

$$\rho\frac{\partial^2 u_i}{\partial t^2} = \frac{\partial T_{ij}}{\partial x_j} \quad (a)$$

where stress tensor divergence in the right part of the formula is equal to the force acting on the unit volume of an elastic body subjected to internal dynamic stresses.

The generalized Hooke's law can be written as follows:

$$T_{ij} = c_{ijkl}S_{kl} = c_{ijkl}\frac{\partial u_l}{\partial x_k} \quad (b)$$

Here $c_{ijkl}$ is the tensor of elastic moduli. Substitution of the formula (b) into the equation (a) results in $$\rho\frac{\partial^2 u_i}{\partial t^2} = c_{ijkl}\frac{\partial^2 u_l}{\partial x_j \partial x_k} \quad (c)$$

For an isotropic solid body $$c_{ijkl} = \lambda\delta_{ij}\delta_{kl} + \mu(\delta_{ik}\delta_{jl} + \delta_{il}\delta_{jk}) \quad (d)$$

I then assume that an elastic medium is found under the condition of static prestress, caused by external forces, defectiveness of the medium, and other reasons. I further assume that prestresses are distributed in the medium continuously. In this case elastic wave propagation in a prestressed medium can be described as superposition of small dynamic strains to, in the general case, finite static strains. The linearized theory of elastic wave propagation in a prestressed medium is correct under this assumption, and consequently elastic waves can be described by equation (3) where the tensor of elastic moduli is given by $$C^+_{ijkl} = c^*_{ijkl} + \sigma^0_{ij}\delta_{ik} \quad (e)$$

where $c^*_{ijkl}$ are effective elastic moduli describing response of a prestressed elastic medium to small dynamic loads, and $\sigma^0_{ij}$ is prestress tensor. By this means I have derived linearized motion equations for a prestressed elastic continuous medium in the form $$\rho\frac{\partial^2 u_i}{\partial t^2} = c^+_{ijkl}\frac{\partial^2 u_l}{\partial x_j \partial x_k} \quad (f)$$

2. Problem Formulation

If one considers two elastic half-spaces having a tight planar contact, the elastic moduli $c_{ijkl}$ of the lower half-space which is not subjected to prestresses differs from the elastic moduli of the upper half-space because of different composing materials. Besides, material of the upper half-space is prestressed and described by the prestress tensor $\sigma^0_{ij}$. In this way the elastic moduli of the upper half-space have the form (e). I then consider a plane wave incident on the interface from the lower half-space. My problem then has the following formulation: it is required to determine propagation direction, polarization, and reflection and refraction amplitudes for known propagation direction, polarization, and amplitude of the incident wave and specified elastic moduli of both half-spaces.

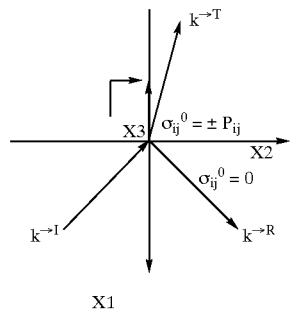

Boundary conditions for a tight contact require strain and stress continuity to be met at any moment of time and at any point of the contact surface specified in this case by the equation $\vec{l} \cdot \vec{x} = 0$, where $\vec{l}$—is the vector normal to the contact surface, and $\vec{x}$—is coordinate in the contact plane $X_2OX_3$. The conditions of strain and stress continuity can be written as follows $$u_i^I + \sum_R u_i^R = \sum_T u_i^T \quad (g)$$

$$T_i^I + \sum_R T_i^R = \sum_T T_i^T \quad (h)$$

Here we use the following indices: I—for incident waves, R—for reflected waves, and T—for refracted waves.

I then consider the following type of monochromatic waves $$u_i = {}^0u_i e^{i(\omega t - \vec{k}\cdot\vec{x})} \quad (i)$$

where ${}^0u_i = u_0 p_i$, $u_0$—is wave amplitude, $p_i$—is polarization vector. The strain continuity condition (g) has the following form for the wave (i)

$$^0u_i^I \exp\{i(\omega^I t - k^{\rightarrow I} x^{\rightarrow})\} + \sum_R {}^0u_i^R \exp\{i(\omega^R t - k^{\rightarrow R} x^{\rightarrow})\} = \tag{j}$$

$$\sum_T {}^0u_i^T \exp\{i(\omega^T t - k^{\rightarrow T} x^{\rightarrow})\}$$

It follows from the formula (j) that at any moment of time $$\omega^I = \omega^R = \omega^T \tag{k}$$

and at any point of the contact surface $$k^{\rightarrow I} x^{\rightarrow} = k^{\rightarrow R} x^{\rightarrow} = k^{\rightarrow T} x^{\rightarrow} \tag{l}$$

I thus derive the following formulae from the equations (l)

$$(k^{\rightarrow R} - k^{\rightarrow I})x^{\rightarrow} = 0, \ (k^{\rightarrow T} - k^{\rightarrow I})x^{\rightarrow} = 0$$

By comparison with the contact surface equation $1^{\rightarrow} x^{\rightarrow} = 0$, one will see that the vectors $(k^{\rightarrow R} - k^{\rightarrow i})$ and $(k^{\rightarrow T} - k^{\rightarrow I})$ are perpendicular to the contact surface. All of the wavenumber vectors lie in the incidence plane specified by the normal $1^{\rightarrow}$ and wavenumber vector $k^{\rightarrow I}$. Projections of all wavenumber vectors to the contact plane are equal to each other. I thus get $$k^R \sin \theta^R = k^T \sin \theta^T = k^I \sin \theta^I$$

Since the frequency content of the reflection wavelets is the same, the directions of wave propagation are determined from the following relations:

$$\sin \theta^R / V(\theta^R) = \sin \theta^T / V(\theta^T) = \sin \theta^I / V(\theta^I)$$

Now I derive simplified boundary conditions for strains from the formula (j)

$$^0u_i^I + \sum_R {}^0u_i^R = \sum_T {}^0u_i^T \tag{m}$$

Substitution of the formula (9) into the Hooke's law (b) gives the following $$T_{ij} = -ic_{ijkl} {}^0u_k k_l \exp[i(\omega t - k^{\rightarrow} x^{\rightarrow})]$$

The boundary conditions for stresses (h) now have the form $$c_{ijkl}\left[k_l^I {}^0u_k^I + \sum_R k_l^R {}^0u_k^R\right] = c_{ijkl}^+ \sum k_l^T u_k^T \tag{n}$$

Here the elastic moduli of stressed medium $c^+_{ijkl}$ are determined from the formula (e).

To simplify further my conclusions I assume that internal stresses determined by the initial stress tensor $\sigma_{ij}^0$ do not violate the medium isotropy, i.e. the tensor $\sigma_{ij}^0$ is isotropic: $\sigma_{ij}^0 = \pm P\delta_{ij}$. Here P– is the tensor diagonal or a value proportional to the pressure (sign+corresponds to relief, and sign–corresponds to compression) in a stressed medium.

3. Particular Case of a Plane Shear Wave with Horizontal Polarization (SH-wave)

For further conclusions I specify propagation direction and polarization of the incident wave. To simplify computations I select SH-wave as an incident wave. With this selection only two waves will appear the contact surface, i.e. reflected wave and refracted wave with the same polarization as that of the incident wave. So I have $$^0u_i = {}^0u p_i = {}^0u \delta_{i3}$$

for each wave. Substitution of this expression into (m) results in $$^0u^I + {}^0u^R = {}^0u^T \tag{o}$$

Condition $1_j = -\delta_{jl}$ is satisfied for the normal $1^{\rightarrow}$, and $^0u_k = {}^0u\delta_{k3}$ Now instead of (n) I derive $$c_{ij3l}[k_l^I {}^0u^I + k_l^R {}^0u^R] = c^+_{ij3l} k_l^T {}^0u^T \tag{p}$$

Since wavenumber vectors lie in the plane defined by the normal $1^{\rightarrow}$ and the wavenumber vector $k^{\rightarrow I}$ of the incident wave, they have only two components (in the axes $X_1$ and $X_2$). By performing summation with respect to the index l I convert the expression (p) to $$c_{i131}[k_1^I {}^0u^I + k_1^R {}^0u^R] + c_{i132}[k_2^I {}^0u^I + k_2^R {}^0u^R] = c^+_{i131} k_1^T {}^0u^T + c^+_{i132} k_2^T {}^0u^T \tag{q}$$

Taking into account my assumption about initial stress tensor isotropy ($\sigma_{ij}^0 = \pm P\delta_{ij}$), derive equation (4) into the following expression for the elastic moduli contained in equation (q)

$$c_{i131} = \lambda\delta_{i1}\delta_{31} + \mu(\delta_{i3}\delta_{11} + \delta_{i1}\delta_{13})$$

$$c_{i132} = \lambda\delta_{i1}\delta_{32} + \mu(\delta_{i3}\delta_{12} + \delta_{12}\delta_{13})$$

It can thus be seen from the latter that only the elastic modulus is not equal to zero for an isotropic medium. So instead of expression (q) I derive $$c_{3131}[k_1^I {}^0u^I + k_1^R {}^0u^R] = c^+_{3131} k_1^T {}^0u^T \tag{r}$$

I now have a system of equations $$\begin{cases} {}^0u^I + {}^0u^R = {}^0u^T \\ c_{3131}[k_1^I {}^0u^I + k_1^R {}^0u^R] = c^+_{3131} k_1^T {}^0u^T \end{cases} \tag{s}$$

I next introduce the reflection and refraction coefficients by definition $$A_R \stackrel{def}{=} \frac{^0u^R}{^0u^I}$$

$$A_T \stackrel{def}{=} \frac{^0u^T}{^0u^I}$$

Then I have the following solution to the equation system (s)

$$A_T = A^R + 1 \tag{t}$$

$$A_T = A_R + 1 \tag{t}$$

$$A_R = \frac{c^+_{3131} k_1^T - c_{3131} k_1^I}{c_{3131} k_1^R - c^+_{3131} k_1^T} \tag{u}$$

Taking into account that $C_{3131} = \mu$ in an isotropic medium, and using the formula (e) and $\sigma^0_{ij} = \pm P\delta_{ij}$ I derive from (u)

$$A_R = A_R(P) = \frac{\mu^* k_1^T - \mu k_1^I \pm P k_1^T}{\mu k_1^R - \mu^* k_1^T \pm P k_1^T} \tag{v}$$

By substituting $k^R{}_1 = -k^I{}_1 = k^I \cos\theta^I$, $k^T{}_1 = -k^T \cos\theta^T$ I obtain $$A_R = \frac{\mu k^I \cos\theta^I - (\mu^* \pm P)k^T \cos\theta^T}{\mu k^I \cos\theta^I + (\mu_\uparrow^* \pm P)k^T \cos\theta^T} \quad (w)$$

After introduction of acoustic impedances of shear waves $Z_3 = \rho v_3$, $Z^*_3 = \rho^* V^*_3$, I obtain $$k^I \mu = \frac{\omega\mu}{V_3} = \frac{\omega\rho(V_3)^2}{V_3} = \omega Z_3$$

$$k^T \mu^* = \omega Z_3^*$$

Introducing notation $$\Delta Z^* = P k^T$$

I finally obtain:

$$A_R = \frac{Z_3 \cos\theta^I - (Z_3^* \pm \Delta Z^*/\omega)\cos\theta^T}{Z_3 \cos\theta^I - (Z_{3\downarrow}^* \pm \Delta Z^*/\omega)\cos\theta^T} \quad (x)$$

The formulae (u)–(x) show that the reflection coefficient and consequently the refraction coefficient depend on the stress condition of the other half-space. Similar results can be obtained for compressional waves and for the case where both half-spaces are prestressed. Formulae for reflection coefficients for the said variants differ from the formula (x) only by constants.

Inventive Results of the Derivation: The Method and its Application

The expression (3) is different from the classical one by an additional member ($\Delta Z^*/\omega$) which depends on the difference between stress conditions of the upper and lower half-spaces. Taking into account the fact that in a discrete medium the elastic moduli have little effect on the changes in stress condition, the expression (3) can be rewritten in the form:

$$A_R = \frac{\Delta Z^*/\omega}{2Z + \Delta Z^*/\omega} \quad (5)$$

If I assume that the elastic moduli do not vary along given reflecting boundary, while pressure P varies, and the reflection coefficients in two points L and M of the reflecting boundary are given by $$\frac{A_R^L}{A_R^M} = \frac{\Delta Z_L^* \omega_M (2Z + \Delta Z_M^*/\omega_M)}{\Delta Z_M^* \omega_L (2Z + \Delta Z_L^*/\omega_L)} \quad (6)$$

Taking into account the expression (4) the formula (6) can be rewritten in the following form with accuracy up to a constant:

$$dP = \frac{P_L}{P_M} \approx \frac{(A_R^L)^a (\omega_M)^2}{(A_R^M)^a (\omega_L)^2}; \quad (7)$$

Where: a=2 for the media with high moduli (carbonate basins), and a=1 for the media with low moduli (terrogenous basins).

By this means the value dP is a relative estimate of pressure changeability along a seismic reflector. For a stacked time section the amplitude of signal is proportional to the reflection coefficient for given reflecting boundary, and I modify expression (7) to contain analytical signal parameters:

$$dP^L(t_i) = \frac{(a^L(t_i))^a (dF^O/dt)^2}{(a^O(t_i))^a (dF^L/dt)^2}$$

where $a(t) = (u^2(t) + v^2(t))^{1/2}$, $F(t) = \arctan(v(t)/u(t))$ is Hillbert transformation, and $a(t)$ and $dF/dt$ are instantaneous amplitudes and frequencies correspondingly. Instead of substitution of the parameters at the point M I use the following idea: amplitude parameters $a^O(ti)$ and $dF^O/dt$ smoothed over the whole horizon represent a model of normal lithostatic pressure, or which is the same, "automatically" account for unknown elastic moduli of the medium.

I then apply expression (8) in the method for estimating pressure gradient on a stacked time section under the following assumptions:

$a^O(ti)$ and $dF^O/dt$ are determined as average values of the instantaneous amplitudes and frequencies for the whole reflecting horizon or some its part taking into account little variability and influence of the elastic moduli of the rocks within a local part of the basin comparatively to the scale of sedimentary process, if $dP(ti)$ is greater than unity, this indicates a reduction of the general pressure at a given point with respect to the average (normal or gravitational) pressure, which indicates a region of unloading, if $dP(ti)$ is less than unity, this indicates an increase of the general pressure up to the normal (average) value or, which is less probable for discrete media, up to a value exceeding the normal pressure.

FIG. 1 illustrates the principle of calculating parameters used in the formula (8). Time section for the seismic line 10 is an example of standard 3D processing in the area of detailed exploration for oil. Graph 10a shows geometry of the tracked reflecting horizon "C" coincident with the top of producing stratigraphic sequence in the terrigenous basin (sandy-argillaceous Jurassic formations). The fragments 16 and 18 show intervals of two traces 2 (Tm) and 5 (Tn) corresponding to said horizon at the points 12 and 14. Also shown here are the results of Hillbert transformation of these traces: 4 and 7—instantaneous amplitude (A), and 3 and 6—instantaneous phase (F). The points $t^m{}_c$ and $t^n{}_c$, indicate position of the tracked horizon "C" after a standard picking procedure via the extrema of reflected wavelet.

To obtain stable values of parameters contained in the formula (8) the following steps are performed:

find a singular point on the phase curve F closest to the point $t^m{}_c$ (the curve F crosses zero at the point $t^m{}_{CR}$), find the previous singular point on the phase curve F closest to the point $t^m{}_{CR}$ (the curve F crosses value of 180 degrees at the point $t^{m1}{}_{CR}$), find the following singular point on the phase curve F closest to the point $t^m{}_{CR}$ (the curve F crosses value of 180 degrees at the point $t^{m2}{}_{CR}/dt$), in the time window specified as described above the normalized values of instantaneous amplitude and instantaneous frequency are given by $$A_C^m = \frac{\sum_{t_{CR}^{m1}/dt}^{t_{CR}^{m2}/dt} a_i}{(t_{CR}^{m2} - t_{CR}^{m1})/dt} \quad (9)$$

$$f_C^m = \frac{\sum_{t_{CR}^{m1}/dt}^{t_{CR}^{m2}/dt} (F_i - F_{i+1})/dt}{(t_{CR}^{m2} - t_{CR}^{m1})/dt} \quad (10)$$

The parameters $A^m_c$ and $f^m_c$ are calculated for all points $t_c$ of the horizon "C" for a given section. As a result we obtain two sets of the normalized values of instantaneous amplitudes and frequencies and after that calculate average values of $A^0_c$ and $f^0_c$ using the following formulae:

$$A_C^0 = \left(\sum_{i=1}^{k} A_C^i\right)/k; \quad (11)$$

$$f_C^0 = \left(\sum_{i=1}^{k} f_c^i\right)/k$$

Finally, use the formula (8) to determine pressure gradients (i.e. relative changeability of pressure) in each point of given horizon "C":

$$dP^i(t^i_c) = (A^i_c/A^0_c)^a (f^0_c/f^i_c)^2 \quad (12)$$

Assumedly the exponent "a" for a terrigenous basin is equal to unity. Finally we determine new values of $t^i_c$ corrected for variation in the frequency spectrum of reflected wavelets along the horizon "C". As is evident from the FIG. 1, the differences $\Delta t\, m = t^{m1}_{CR} - t^m_{CR}$ and $\Delta t n = t^{n1}_{CR} - t^n_{CR}$ for two traces 12(m) and 14(n) are not equal to each other because of difference in frequency content of the same reflection in two distant points of the tracked horizon. Consequently, all the values $t^i_c$ should be corrected as follows:

$$t^{inew}_c = t^i_c - 2(1/f^i_c - 1/f^0_c) \quad (13)$$

It should be appreciated that the map of pressure gradients which is generated using Eqn. 12, an example of which is shown in FIG. 3, can be of value in and of itself for identifying regions of differential rock pressure. Such can be used for example in the study of earthquakes, including predicting areas of likely seismic activity.

FIG. 2 represents the complete chart of the proposed seismic data interpretation method targeted at determining relative pressure estimates and locating oil and gas fields. Preferably the input data for the interpretation method are stacked time sections obtained as a result of standard 2D or 3D processing. In a first embodiment the interpretation scheme is applied to the results of 3D processing. The input data are, for example, the set of stacked time sections (gathered in in-line or on-line direction) marked in the FIG. 2 by blocks 20, 40 and 42. The process, preferably, starts from the section 22. At first, a selected horizon is picked in manual or automatic mode using a generally accepted principle of tracking via the extrema of wavelets belonging to this horizon. The picked traveltimes $t^i c$ are, preferably, saved in the matrix 34 and transmitted to the following step 24 where the Hillbert transformation is preferably performed.

At the step 26, the picked traveltimes $t^i c$ are advantageously used to calculate normalized values of instantaneous amplitudes and frequencies $A^i_c$ and $f^i_c$ using the formulae (9) and (10). Then, at the step 28, we advantageously determine the average values $A^0_c$ and $f^0_c$ for obtained data sets. At the step 30, desired values of relative pressure changeability $dP^i$ are advantageously found and the obtained data set is preferably saved in the matrix 36. At the step 32 we advantageously determine corrections for signal frequency variability and correct the values $t^{inew}_c$ preferably using the formula (13). The corrected traveltime values are preferably saved in the matrix 38.

Then all the before mentioned steps are preferably applied to the section 40 and so on until the steps have been applied to all sections. When the last section (42) has been processed, we will have filled matrices 34, 36, and 38, which can be used for generating the following maps: initial isochron map, pressure gradient map, and corrected isochron map. These maps are the basis for identifying the most probable locations of oil, gas, water and other fluid accumulations.

FIG. 3 shows a relative pressure changeability map (44) for the producing horizon "C". The map has been created using the described scheme for an oil field in the terrigenous basin. The regions of anomalously low relative pressure values, of which 80, 82 and 84 are representative, have been shaded red and represent a hydrocarbon indicator for fractured reservoirs in sandy-argillaceous Jurassic formations. The obtained result is then compared with the reflector geometry which is shown in FIGS. 4.

FIG. 4a shows an isochron map for given horizon (fragment 46) and FIG. 4b shows a map of traveltime corrections dt c (fragment 48). Several positive anomalies of traveltime corrections can be seen in FIG. 4b. If we apply the traveltime corrections, new anticlinal structures (namely 50, 52, and 54) not previously detected on the results of standard horizon picking appear on the traveltime map. Vertical closures of the newly delineated structures are of 20–30 m, the value of great importance for the region of low-relief oil-bearing structures.

FIG. 5 shows final interpretation results: the relative pressure changes map (FIG. 3) has been laid over corrected isochron map shown in the FIG. 4a. The isochrons have been drawn as contours while the value of the relative pressure changeability estimates have been indicated using a color palette. The red shading (e.g., 58 and 68) corresponds to anomalously low values of changeability, while blue shading (e.g., 90) corresponds to normal lithostatic pressures.

Analysis of the map of FIG. 5 brings us to the following conclusions:

low-pressure regions (58, 60, 62, 64, 66, 68 and 70) are localized;

these regions coincide with highs on the isochron map of FIG. 4a;

the regions 58, 60, and 62 coincide with previously discovered oil fields which verifies the high quality and fidelity of my method for predicting the presence of fluid;

the regions 64, 66, 68 and 70 should be therefore recommended for exploratory drilling.

At the final step, the depth map for producing the horizon is advantageously constructed by implementing a standard time-to-depth conversion technique to the corrected isochron map (48). This map together with pressure estimates and recommended exploratory drilling locations can be used at the prospect evaluation stage as well as at the field development planning stage, because the estimates of relative pressures in the reservoir can have the key role while selecting methods and technologies of oil production, like in this particular case.

It is to be appreciated that the method described can, as suggested in the above paragraph, further include using classical, and future, discovered, seismic interpretation techniques in conjunction with the resulting pressure-isochron map. For example, classical seismic interpretation techniques are useful for identifying faults and traps which can cause fluids to accumulate in a subterranean reservoir. When an area of interest identified by the pressure-isochron map corresponds with the presence of a fluid trap, the likelihood that fluids are present in the identified area is increased.

The described methods are preferably performed using a computer. Thus, the invention further includes a computer configured to carry out the disclosed methods. The computer is configured to read a computer readable medium or computer memory which contains computer-executable steps for performing the steps of the method shown and described in the chart of FIG. 2. Generally, sets of computer-executable instructions for performing seismic data processing and generating resulting maps or seismic sections for interpretation are common in the industry, and in fact constitute the typical manner by which seismic methods are carried out. Examples of computer readable medium include a hard drive, a tape drive, a diskette, and ROM (read only memory) devices, such as a compact disk. Examples of computer readable memory include a hard drive and RAM (random access memory). As a result of performing the computer-executable steps on an appropriate input data set, the computer produces a product data set. The product data set can be outputted in the form of charts or graphs which are indicative of relative pressure changeability $dP^i$ of a subterranean region, pressure gradients in the region, corrected traveltime values $t^{inew}_c$ of the region, or any of the following maps: an initial isochron map, a pressure gradient map, a corrected isochron map, or an overlay of the relative pressure changeability map and the corrected isochron map. As indicated earlier, these maps are the basis for identifying the most probable locations of oil, gas, water and other fluid accumulations.

I claim:

1. A method for identifying pressure gradients within a region of a subterranean formation, said region being characterized by a seismic image, said seismic image comprising a stacked time section representing horizons within said region, the method comprising the sequential acts of:
   a) picking a first selected horizon from said seismic image;
   b) calculating a set of instantaneous amplitudes and instantaneous frequencies for said first selected horizon;
   c) determining the average amplitude and the average frequency of said set of instantaneous amplitudes and instantaneous frequencies; and
   d) identifying pressure gradients associated with said set of instantaneous amplitudes and instantaneous frequencies to generate a pressure gradient map, said pressure gradients corresponding to points at which said set of instantaneous amplitudes and instantaneous frequencies vary from said average amplitude and said average frequency, wherein points at which said set of instantaneous amplitudes and instantaneous frequencies are less than said average amplitude and said average frequency correspond to locations of relatively low pressure.

2. The method of claim 1 wherein said first selected horizon has associated traveltimes, and wherein said instantaneous amplitudes and frequencies are calculated by the Hillbert transformation using said traveltimes.

3. The method of claim 1 wherein said first selected horizon has associated traveltimes $t^i_c$, and wherein said instantaneous amplitudes $A^m_c$ and frequencies $f^m_c$ are calculated by the equations $$A^m_C = \frac{\sum_{t^{m1}_{CR}/dt}^{t^{m2}_{CR}/dt} a_i}{(t^{m2}_{CR} - t^{m1}_{CR})/dt}$$

and $$f^m_C = \frac{\sum_{t^{m1}_{CR}/dt}^{t^{m2}_{CR}/dt} (F_i - F_{i+1})/dt}{(t^{m2}_{CR} - t^{m1}_{CR})/dt}.$$

4. The method of claim 2 wherein said horizon is comprised of reflected wavelets, and wherein, prior to applying said Hillbert transform, said traveltimes are corrected for variation in the frequency spectrum of said reflected wavelets along said horizon.

5. The method of claim 4 wherein said traveltimes $t^i_c$ are corrected by the formula $$t^{inew}_c = t^i_c - 2(1/f^i_c - 1/f^0_c).$$

6. The method of claim 2 wherein said pressure gradient associated with said traveltime $dP^i(t^i_c)$ is calculated using the formula $$dP^i(t^i_c) = (A^i_c/A^0_c)^a (f^0_c/f^i_c)^2.$$

7. An apparatus for improving identification of locations of accumulation of fluids within a region of a subterranean formation, said region being characterized by a seismic image represented by a seismic data set, said seismic image comprising a stacked time section representing horizons within said region, said horizons having associated isochronal maps, each said isochronal map having areas of relative highness and lowness relative to the average elevational dimension of said isochronal map, the apparatus comprising:
   a computer having a memory configured to store the seismic data set, the computer being configured to perform the steps of:
      picking a first selected horizon from said seismic image;
      calculating a set of instantaneous amplitudes and frequencies for said first selected horizon;
      determining the average amplitude and frequency of said set of instantaneous amplitudes and frequencies;
      identifying pressure gradients, said pressure gradients comprising points at which said instantaneous amplitudes and frequencies vary from said average amplitude and frequency, wherein points at which said instantaneous amplitudes and frequencies are less than said average amplitude and frequency correspond to locations of relatively low pressure; and
      storing said pressure gradients in said computer memory to produce a product data set; and
   an output device configured to output the product data in the form of a visual pressure gradient map capable of being overlayed with the isochronal map corresponding to said first selected horizon, thereby allowing identification of locations more likely to contain fluids than other locations, said locations more likely to contain fluids being those locations of relatively low pressure indicated on said pressure gradient map which correspond to relatively high areas of said iscohron map.

8. The apparatus of claim 7 wherein said first selected horizon comprises traveltimes, and wherein said computer is further configured to perform the step of calculating said instantaneous amplitudes and frequencies using the Hillbert transformation with said traveltimes.

9. The apparatus of claim 7 wherein said first selected horizon comprises traveltimes $t^i_c$, and wherein said computer is further configured to perform the step of calculating said instantaneous amplitudes $A^m_c$ and frequencies $f^m_c$ using the equations $$A^m_C = \frac{\sum_{t^{m_1}_{CR}/dt}^{t^{m_2}_{CR}/dt} a_i}{(t^{m_2}_{CR} - t^{m_1}_{CR})/dt}$$

and $$f^m_C = \frac{\sum_{t^{m_1}_{CR}/dt}^{t^{m_2}_{CR}/dt} (F_i - F_{i+1})/dt}{(t^{m_2}_{CR} - t^{m_1}_{CR})/dt}.$$

10. The apparatus of claim 8 wherein said horizon is comprised of reflected wavelets, and wherein said computer is further configured to, prior to applying said Hillbert transform, perform the step of correcting said traveltimes $t^i_c$ for variation in the frequency spectrum of said reflected wavelets along said horizon using the formula $$t^{inew}_c = t^i_c - 2(1/f^i_c - 1/f^0_c).$$

11. The apparatus of claim 8 wherein said computer is further configured to perform the step of calculating the pressure gradient associated with said traveltime $dP^i(t^i_c)$ using the formula $$dP^i(t^i_c) = (A^i_c/A^0_c)^a (f^0_c/f^i_c)^2.$$

12. A computer readable medium having computer-executable instructions for performing the following steps:
picking a first selected horizon from a seismic data set representing a seismic image of a region of a subterranean formation, said seismic image comprising a stacked time section representing horizons within said region, said horizons having associated isochronal maps, each said isochronal map having areas of relative highness and lowness relative to the average elevational dimension of said isochronal map;

calculating a set of instantaneous amplitudes and frequencies for said first selected horizon;

determining the average amplitude and frequency of said set of instantaneous amplitudes and frequencies;

identifying pressure gradients, said pressure gradients comprising points at which said instantaneous amplitudes and frequencies vary from said average amplitude and frequency, wherein points at which said instantaneous amplitudes and frequencies are less than said average amplitude and frequency correspond to locations of relatively low pressure; and storing said pressure gradients on a computer-readable medium to produce a product data set representative of a pressure gradient map capable of being overlayed with the isochronal map corresponding to said first selected horizon, thereby allowing identification of locations more likely to contain fluids than other locations, said locations more likely to contain fluids being those locations of relatively low pressure indicated on said pressure gradient map which correspond to relatively high areas of said iscohron map.

13. Method for improving identification of locations of accumulation of fluids within a region of a subterranean formation comprising:

determining pressure gradients for a plurality of locations within said region, said pressure gradients indicating locations of pressure varying from relatively low pressure to relatively high pressure;

comparing isochrons associated with said plurality of locations with said pressure gradients at said locations, said isochrons indicating locations of elevation varying from relatively low elevations to relatively high elevations;

identifying locations having corresponding relatively low pressures and relatively high elevations as locations more likely to contain fluids than other locations within said region.

* * * * *